US010929069B2

(12) United States Patent
Tomic et al.

(10) Patent No.: US 10,929,069 B2
(45) Date of Patent: Feb. 23, 2021

(54) ADDRESSING PAGE-CORRELATED READ ISSUES USING INTRA-BLOCK PARITY

(71) Applicant: International Business Machines Corporation, Armonk, NY (US)

(72) Inventors: Sasa Tomic, Kilchberg (CH); Nikolaos Papandreou, Thalwil (CH); Roman Alexander Pletka, Uster (CH); Nikolas Ioannou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/128,603

(22) Filed: Sep. 12, 2018

(65) Prior Publication Data

US 2020/0081661 A1   Mar. 12, 2020

(51) Int. Cl.
*G06F 12/00* (2006.01)
*G06F 3/06* (2006.01)
*G06F 12/02* (2006.01)

(52) U.S. Cl.
CPC ............ *G06F 3/0679* (2013.01); *G06F 3/064* (2013.01); *G06F 3/0604* (2013.01); *G06F 12/0246* (2013.01)

(58) Field of Classification Search
CPC ........ G06F 11/10; G06F 3/06; G06F 12/0246; G06F 3/0679; G06F 3/064; G06F 3/0604
See application file for complete search history.

(56) References Cited

U.S. PATENT DOCUMENTS

| 9,262,268 B2 | 2/2016 | Cai et al. |
| 9,652,381 B2 | 5/2017 | Higgins et al. |
| 2011/0239088 A1 | 9/2011 | Post |
| 2013/0205102 A1 | 8/2013 | Jones et al. |

(Continued)

FOREIGN PATENT DOCUMENTS

WO   2017103751 A1   6/2017

OTHER PUBLICATIONS

Conor Ryan, Solving 3D Flash's Error Recovery Problem, Flash Memory Summit 2017, 63 pages, https://www.flashmemorysummit.com/English/Collaterals/Proceedings/2017/20170810_SIT11_Ryan.pdf.

(Continued)

*Primary Examiner* — Arvind Talukdar
(74) *Attorney, Agent, or Firm* — Daniel Morris; Otterstedt, Wallace & Kammer, LLP

(57) ABSTRACT

A method for intra-block recovery of an Erasure Code protected memory page stripe may be provided. The method comprises providing a data storage device comprising a plurality of EC protected memory page stripes, each of which comprising a plurality of memory pages, wherein corresponding memory pages of the plurality of the page stripes are organized as a plurality of blocks comprising each the corresponding pages, each memory page comprising a plurality of non-volatile memory cells, and wherein each page stripe comprises at least one stripe parity page, grouping memory pages of a block into at least one window, each window comprising a plurality of memory pages of the block, and maintaining at least one parity page for each window of the block, such that a page read failure is recoverable even if multiple memory pages per page stripe experience a read failure concurrently.

24 Claims, 10 Drawing Sheets

(56) References Cited

U.S. PATENT DOCUMENTS

| | | |
|---|---|---|
| 2015/0178149 A1* | 6/2015 | Cai ..................... G06F 11/108 |
| | | 714/766 |
| 2017/0160960 A1* | 6/2017 | Camp ................... G06F 3/0619 |
| 2017/0329525 A1 | 11/2017 | Simonson et al. |
| 2018/0129600 A1* | 5/2018 | Ishiyama .............. G06F 11/108 |
| 2019/0042299 A1* | 2/2019 | Neiger ................ G06F 9/45558 |
| 2020/0081831 A1 | 3/2020 | Tomic et al. |

OTHER PUBLICATIONS

Paul J. Otterstedt, pp. 1-2, Oct. 1, 2020, List of IBM Patents or Patent Applications Treated as Related.

* cited by examiner

100

102 providing a data storage device comprising a plurality of erasure code protected memory page stripes 104 grouping memory pages of a block into at least one window 106 maintaining at least one parity page for each window of the memory pages

ADDRESSING PAGE-CORRELATED READ ISSUES USING INTRA-BLOCK PARITY

BACKGROUND

The invention relates generally to a method for intra-block recovery of an Erasure Code protected memory (EC) page stripe, and more specifically, to a method for intra-block recovery of an EC protected memory page stripe from multiple correlated memory page read failures that render the conventional inter-block EC parity protection insufficiently. The invention relates further to a system for intra-block recovery of an Erasure Code (EC) protected memory page stripe from multiple correlated memory page read failures, and a computer program product.

The ever-increasing amount of data to be stored in enterprise data centers drives the need for effective, reliable and energy-efficient persistent storage devices. Another requirement for enterprise data storage devices is low data access latency. One way to address these needs is in using solid state drives (SSDs) instead of traditional hard disk drives (HDDs). It is well understood that the performance characteristics of these two alternatives are fundamentally different. NAND flash-based SSDs guarantee typically one order of magnitude faster write operations and lower latency due to the higher parallelism of read and write operations inside the storage device.

Conventional SSDs used to be based on single-level memory cells (SLC) NAND flash. These use single storage cells based on floating gate transistors or charge trapping storage cells connected in series like in a NAND (NOT AND) gate.

In order to address the ever-increasing density requirements for storage media, also multi-level cells (MLC), triple-level cells (TLC), and soon quadruple-level cell (QLC) NAND flash may be used. A large number (typically a few thousand) of physical cells is connected via a word line, and a certain number of word lines together with respective physical cells are physically grouped into a flash block. A word line may consist of multiple data pages. For instance, a TLC NAND flash device has three types of data pages: a lower, and upper, and in extra page sharing the same word line. However, storing more user data in the same physical space typically has the downside of a decreased margin for regular variations in physical properties of the storage media (for example, charge leak or buildup), leading to an increased error rate compared to the less dense storage devices. For example, in TLC NAND flash, a lower, upper, and extra page may share the same word line. It turns out, that especially the extra pages may be more likely to have failures than lower and/or upper pages or even than some other extra pages.

It may also be noted that the problem described above is not only restricted to 3D (three dimensional) NAND flash memories and may be present in various forms and extends also into 2D (two dimensional) NAND flash memory and, also, other non-volatile storage media like, e.g., phase change memories (PCM), magneto-resistive random access memory (MRAM), and others. In all these cases, a probability of failure may depend on the internal storage media organization and architecture, and the particular physical properties of the given storage media.

Documents relating to the technical background of the proposed concept include, e.g., US 2017/0329525 A1, which describes a method for an enhanced read recovery based on write time information. The method includes opening a block of flash memory cells for programming, tracking a block open time, and performing a read operation of a programmed page from the block based at least in part on the block open time. The document US 2015/0370701 A1 describes a method and/or a device to be used to enable garbage collection of a sub-block of an individually erasable block of a storage medium in a storage device. The method includes determining a first trigger parameter in accordance with one or more operating conditions of a first sub-block and if the $1^{st}$ criterion is met, the garbage collection of the first sub-block is executed. Also, part of the proposed method comprises determining a second trigger parameter in accordance with one or more operating conditions of a second sub-block of the erase block in the storage medium and if the $2^{nd}$ criteria is met the garbage collection of the second sub-block is executed.

However, these solutions do not address the problem of multiple failures of memory pages of a stripe, in particular in flash memory using TLCs. To address this is one of the objectives of the here proposed concept.

SUMMARY

According to one aspect of the present invention, a method for intra-block recovery of an Erasure Code (EC) protected memory page stripe from multiple correlated memory page read failures may be provided.

The method may comprise providing a data storage device comprising a plurality of EC protected memory page stripes. Each of the page stripes may comprise a plurality of memory pages. Corresponding memory pages of the plurality of the page stripes may be physically organized as a plurality of blocks and each memory page may comprise a plurality of non-volatile memory cells. Additionally, each page stripe may comprise at least one stripe parity page.

The method may further comprise grouping memory pages of a block into at least one window, wherein each window may comprise a plurality of memory pages of the block, and maintaining at least one parity page for each window of the block, such that a page read failure may be recoverable even if multiple—in particular, more than the EC correction capability—pages per stripe experience a read failure concurrently.

According to another aspect of the present invention, a system for intra-block recovery of an Erasure Code (EC) protected memory page stripe from multiple correlated memory page read failures may be provided. The system may comprise a data storage device comprising a plurality of EC protected memory page stripes, each of which comprising a plurality of memory pages. Corresponding pages of the plurality of the page stripes may be physically organized as a plurality of blocks comprising each the corresponding pages. Each memory page may comprise a plurality of non-volatile memory cells, and each page stripe may comprise at least one stripe parity page.

The system may additionally comprise a grouping unit adapted for grouping memory pages of a block into at least one window, each window comprising a plurality of memory pages of the block, and at least one parity page for each window of the block, such that a page read failure is recoverable even if multiple—in particular, more than the EC correction capability—pages per page stripe experience a read failure concurrently.

It may also be noted that stripes and blocks may be organized in a matrix-like architecture.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

Based on the general concept just described, also additional enhanced embodiments may be implemented in form of the method, the system or the related computer program product:

According to an additional embodiment of the method, each of the windows may be a physical window comprising consecutive memory pages of a block or, alternatively, a logical window comprising non-consecutive memory pages of a block. Thus, both alternatives may be considered in a real implementation. The advantage of logical windows may be in the fact that memory pages may be written, not in a consecutive form but based on a specific algorithm optimizing the write process to the block stripe.

According to another embodiment of the method, the window size and the grouping of memory pages into a window may be performed according to a predefined schema. Such a static assignment of memory pages to windows would be easily implementable and may involve only minor overhead. However, it may lack flexibility and may show limitations. On the other hand, this way, a clear root cause in case of failures may be determined.

According to one advantageous embodiment of the method, the schema for window sizes and grouping of memory pages into the windows may reflect a likelihood of the memory pages to cause a read failure. Thus, these likelihoods may be determined based on the architecture and organization of the page stripes and the block stripe as well as particular physical properties of the memory pages. Thus, the sizes of the windows and the grouping of memory pages may be based on experimental and experience values and may enhance the reliability of the storage device.

According to another advantageous embodiment of the method, the window size and the grouping of the memory pages may be determined dynamically based on statistics of the data storage device. In particular, in one embodiment, a parameter of the runtime statistics may be a function of data written to the data storage device, in particular, the block stripe in question. Thus, dynamically derivable runtime parameters may be used to assign memory pages in a variable manner to variable sized physical (consecutive memory pages in the block) or logical windows.

According to one further embodiment of the method, the window parity page may be one of the memory pages of the corresponding window. This way, an easy relationship between the memory pages of a window and the related window parity page may be established. In a typical case, the last memory page of a window may be used as window parity page.

According to an alternative embodiment of the method, the window parity page (related to the block) may be maintained outside the EC protected page stripes. This may be done in a volatile or non-volatile memory. It may have the advantage that storage capacity in the block stripe for host data or net data is not lost, wherein the term 'net data' may refer to the amount of data actually usable (excluding meta data required to the internal organization of a larger flash memory module).

In this embodiment, the complete amount of memory pages of the block stripe may be used for data (apart from the parity pages per page stripe), equivalent to a conventionally EC-protected storage device. Additionally, in case the window parity page may be stored in volatile RAM (Random Access Memory) of a controller of a related computer system, the write process may be faster if compared to the write process to a non-volatile memory page. Thus, the latency of the block stripe accesses may also be decreased.

According to another advantageous embodiment of the method, upon a power failure, the window parity page may be maintained in a persistent storage. I.e., if, e.g., a power failure may happen, the data may be written into a persistent storage. Hence, the-parity and recover information for failed memory pages is not lost during an intermediate power loss or another power problem.

According to one enhanced embodiment of the method, the window parity page may be released—i.e., no longer used and freed to be used for other purposes—once all memory pages of the related window are completely written. This may be particularly useful in cases in which write failures happen with a high probability during the period the memory pages of a window are not completely written.

According to one additionally enhanced embodiment of the method, the window parity page may be released—see above—once a predefined number of memory pages of a window are completely written. Thus, the concept used for releasing the window parity page may also be applicable for a not completely filled or written window. This way, used memory space may be released and the available resources may be better utilized.

According to another alternative embodiment of the method the window parity page may be released once the entire block of memory pages is completely written. This may increase the reliability of the block stripe—i.e., on memory pages/page stripes—because it may represent a compromise between the alternative to release the window parity page once a window is completely written in keeping a block parity page as part of the block permanently.

According to one useful embodiment of the method the memory pages are implemented using at least one selected out of the group comprising, multi-level cells (MLC), triple-level memory cells, (TLC), quadruple-level cells (QLC). However, also other types of non-volatile memory systems—e.g., solid-state disks, PCMs—may benefit from the proposed concept. On the other side, the proposed concept may particularly be useful for the mentioned types of memory cells because it is known that due to the high density of memory cells, and the plurality of data bits stored in one physical memory cell, particular memory pages stored in these cells have an increased failure probability.

According to one additionally useful embodiment of the method, the data storage device may be a component of a memory flash drive. Thus, the currently very often used technology in mobile devices—but also in enterprise-scale storage systems using non-volatile memory systems—may benefit from the proposed advanced memory page management and error correction technology.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention, are apparent from the examples of embodiments to be described hereinafter and are explained with reference to the examples of embodiments, but to which the invention is not limited.

Figure 1:
Figure 1:
Figure 1:

Preferred embodiments of the invention will be described, by way of example only, and with reference to the following drawings:

FIG. 1 shows a block diagram of an embodiment of the inventive method for intra-block recovery of an Erasure Code protected memory page stripe.

Figure 2:
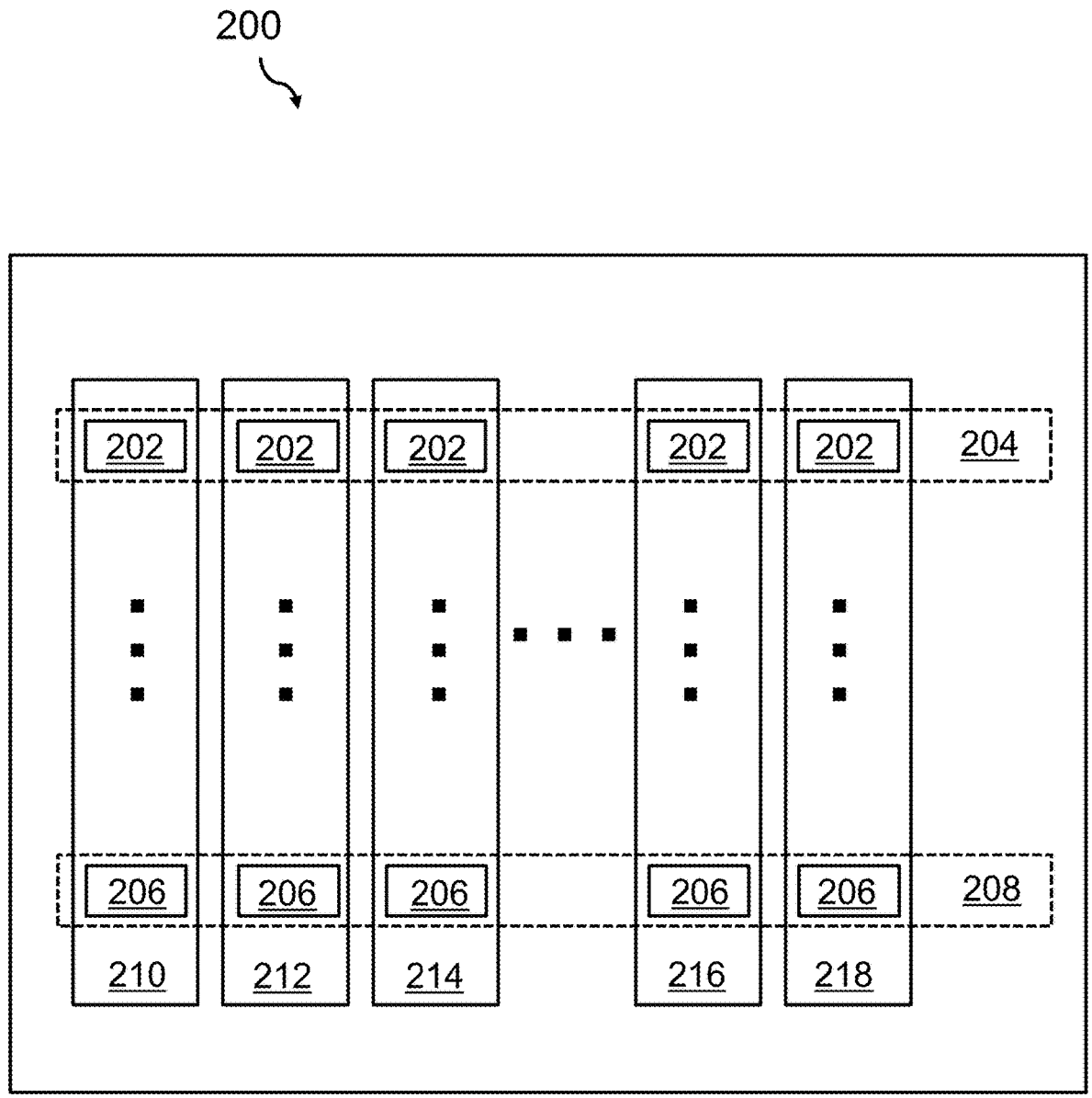

FIG. 2 shows a block diagram of a traditional block stripe comprising a plurality of memory pages.

Figure 3:
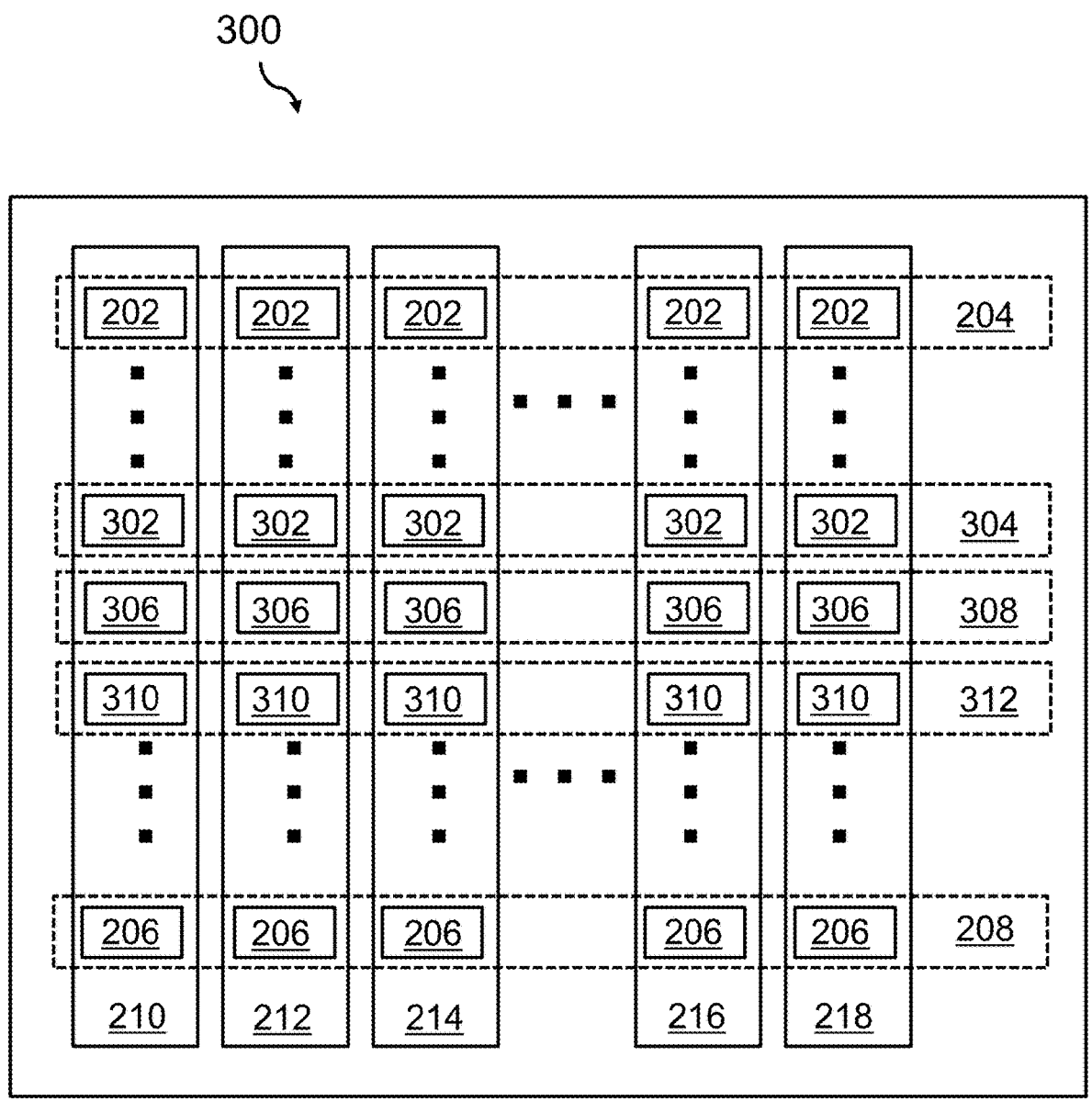

FIG. 3 shows a block diagram with TLC-type-based memory pages.

Figure 4:
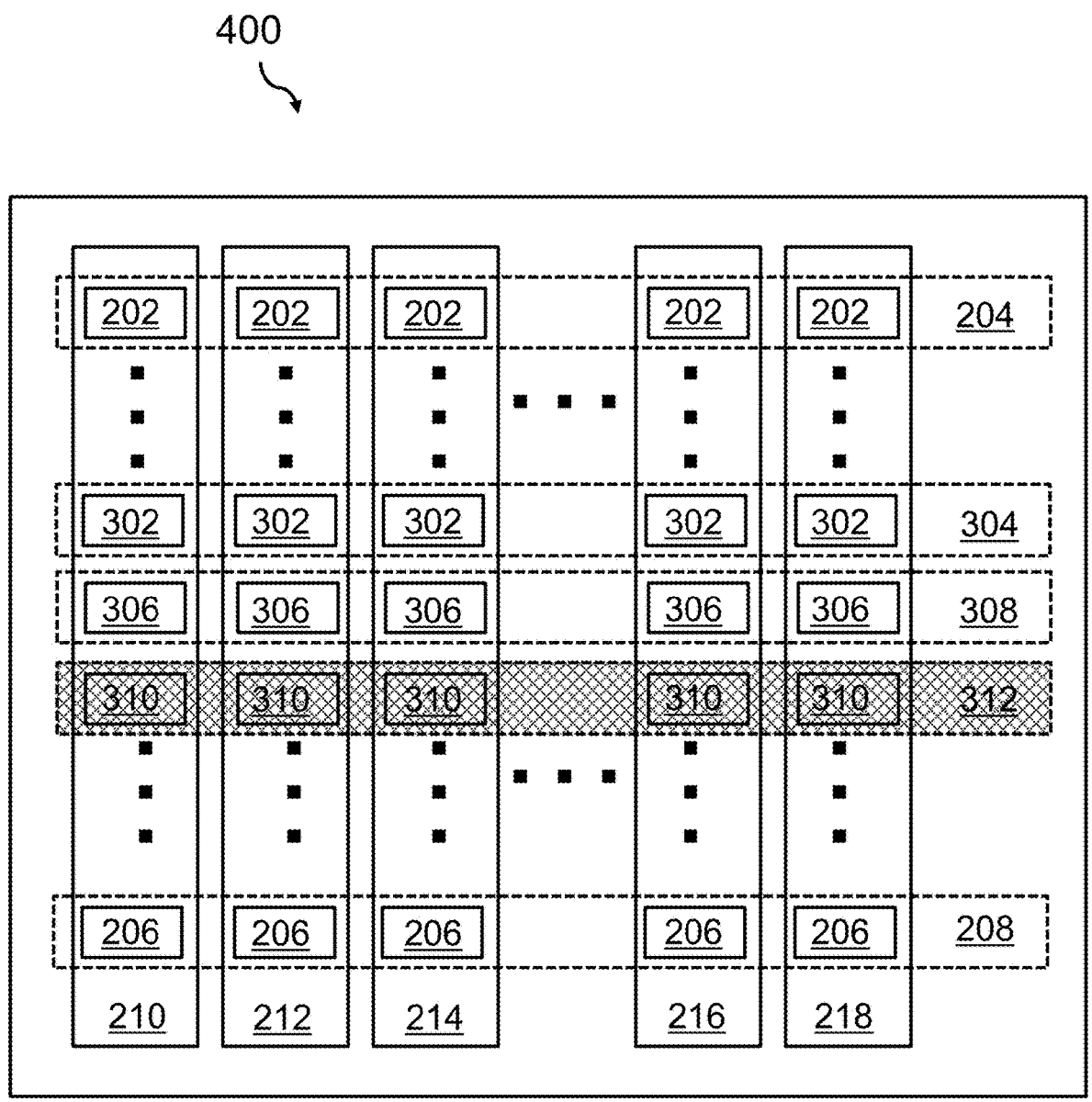

FIG. 4 shows a block diagram of the TLC-type-based memory pages highlighting memory pages with a higher failure probability.

Figure 5:
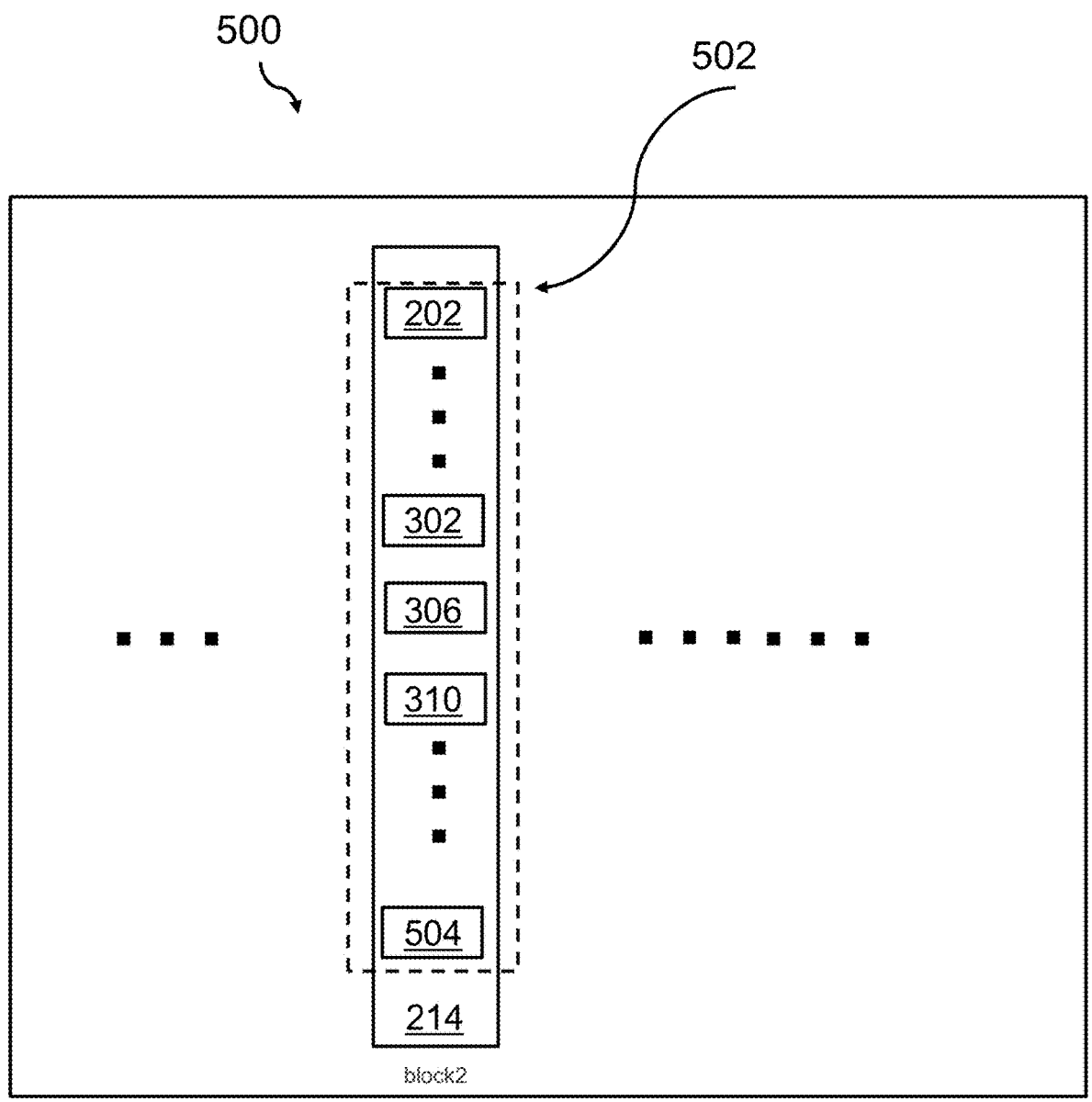

FIG. 5 shows a block diagram of an embodiment of a single block of memory pages with a single window.

Figure 6:
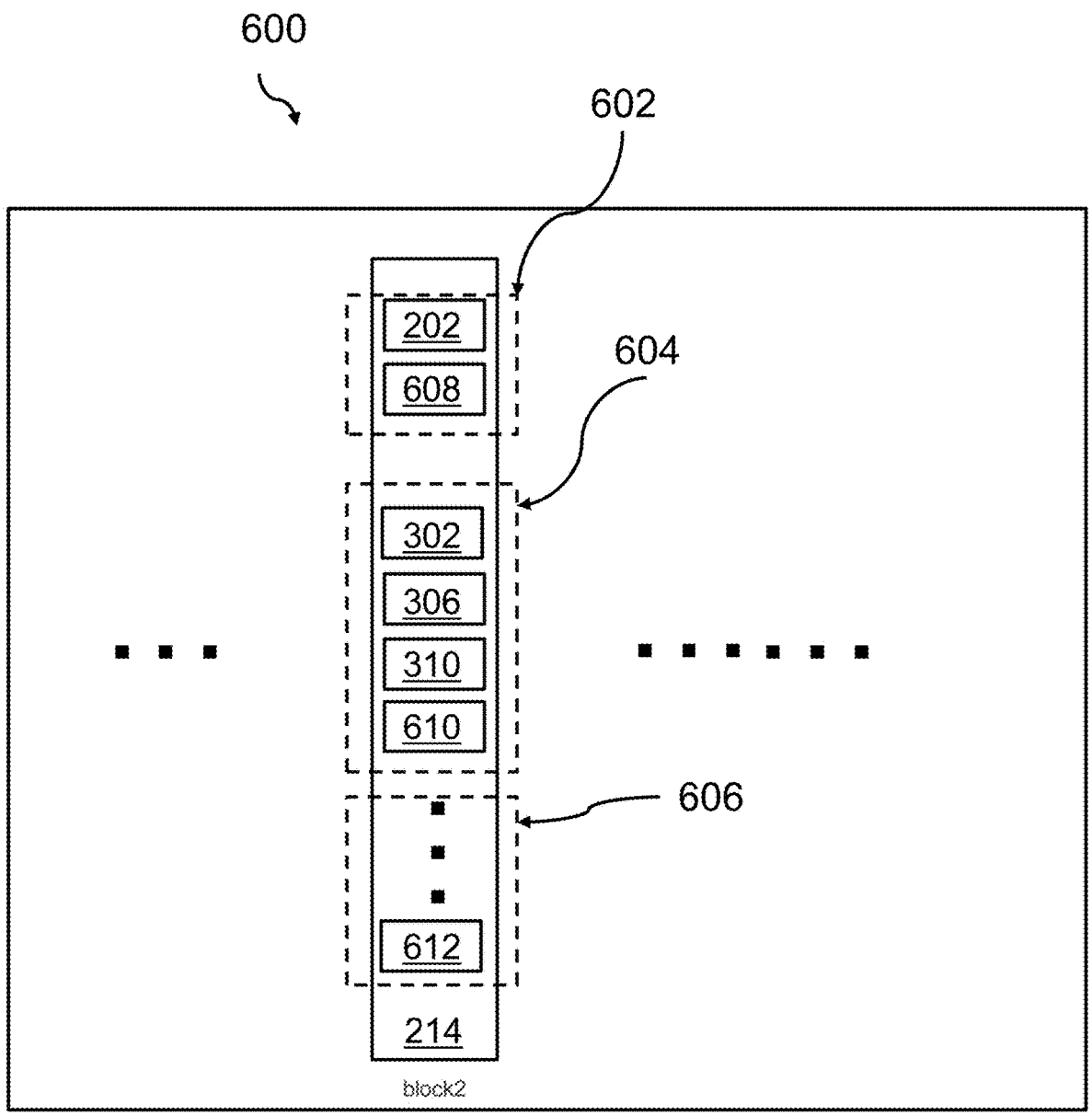

FIG. 6 shows a block diagram of an embodiment of a single block of memory pages with a plurality of windows in which the memory pages are grouped.

Figure 7:
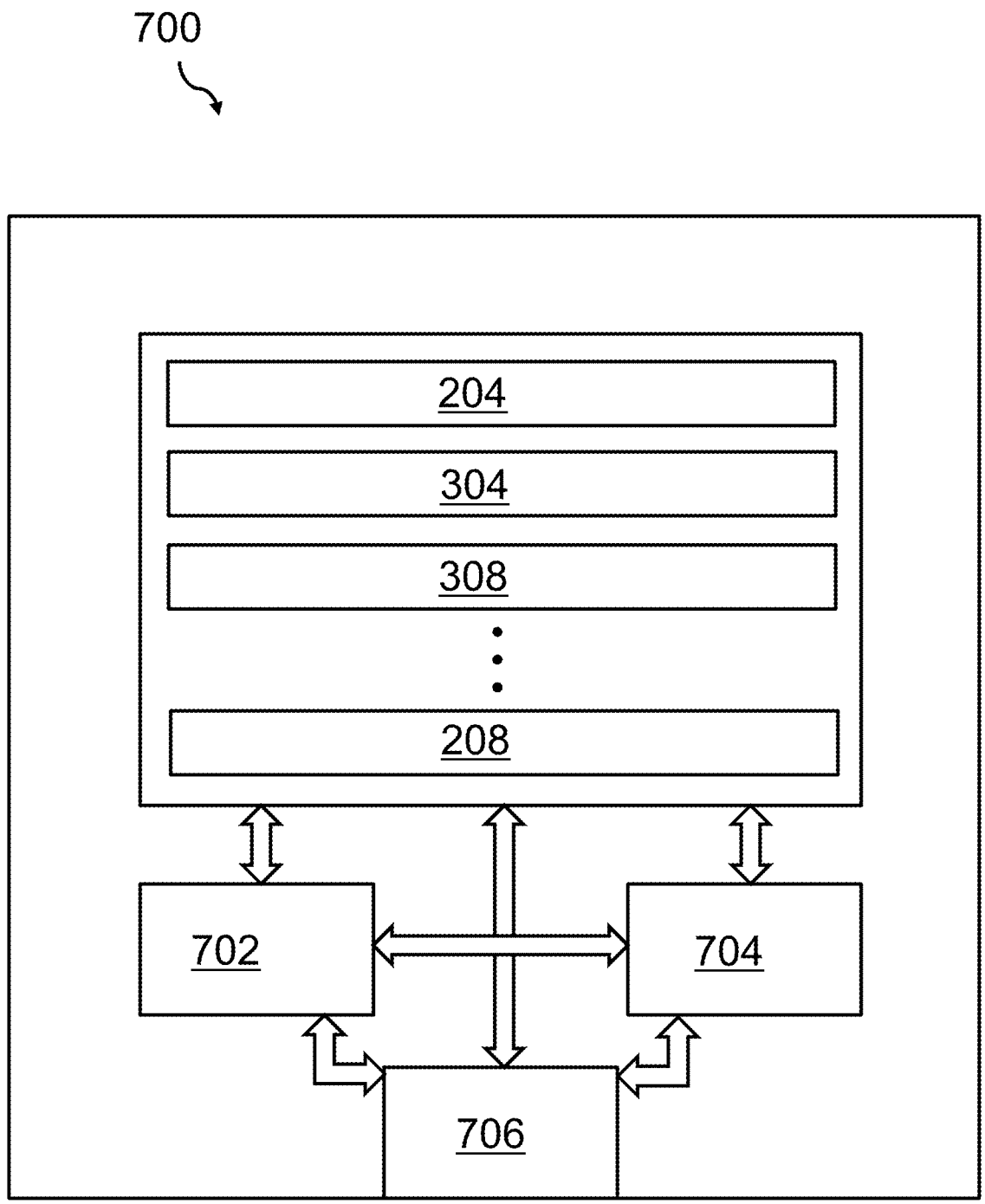

FIG. 7 shows a block diagram of the system for intra-block recovery of an Erasure Code protected memory page stripe from multiple correlated memory page read failures.

Figure 8:
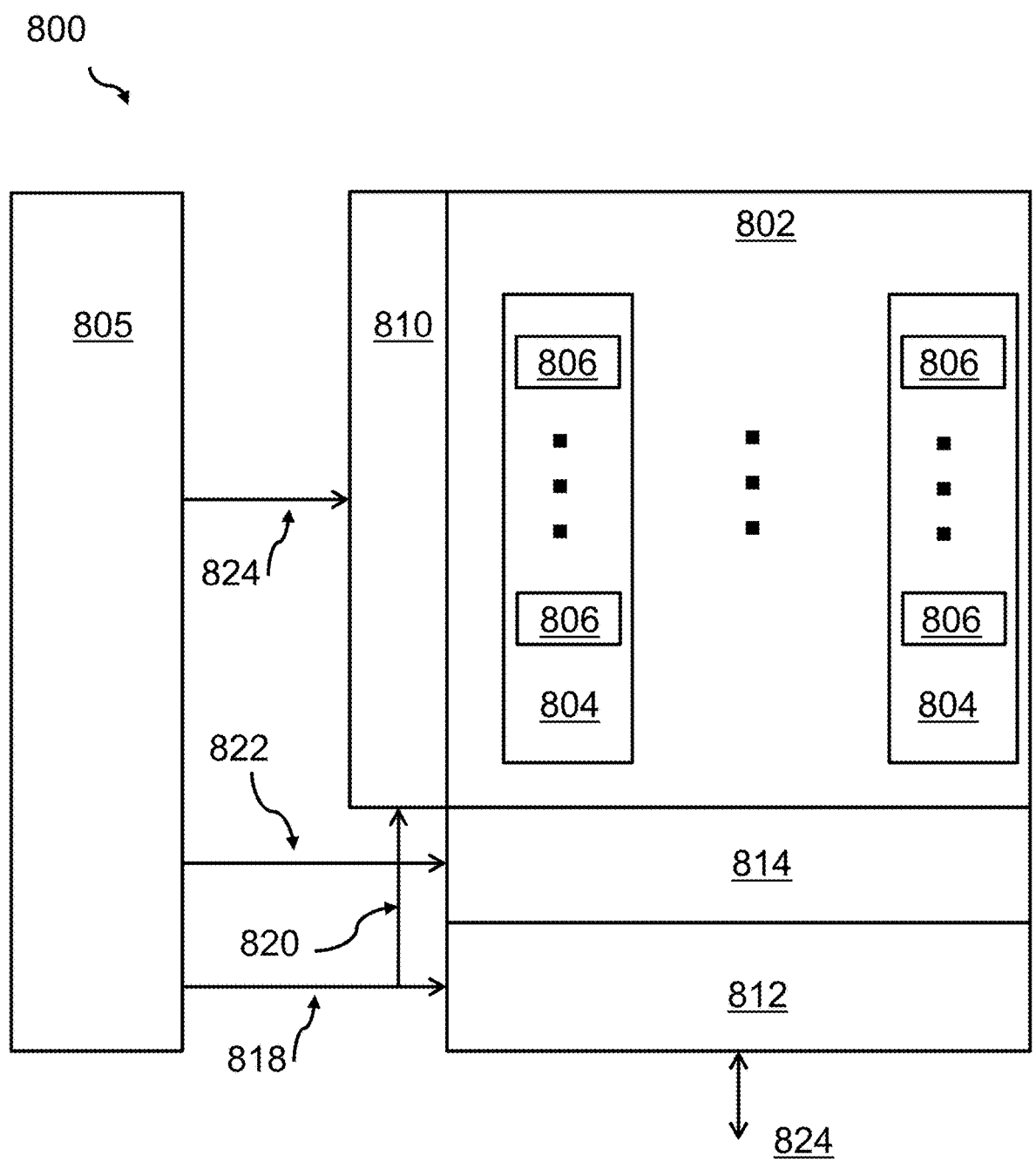

FIG. 8 shows a block diagram of an exemplary flash memory module that can be utilized to implement the proposed concept.

Figure 9:
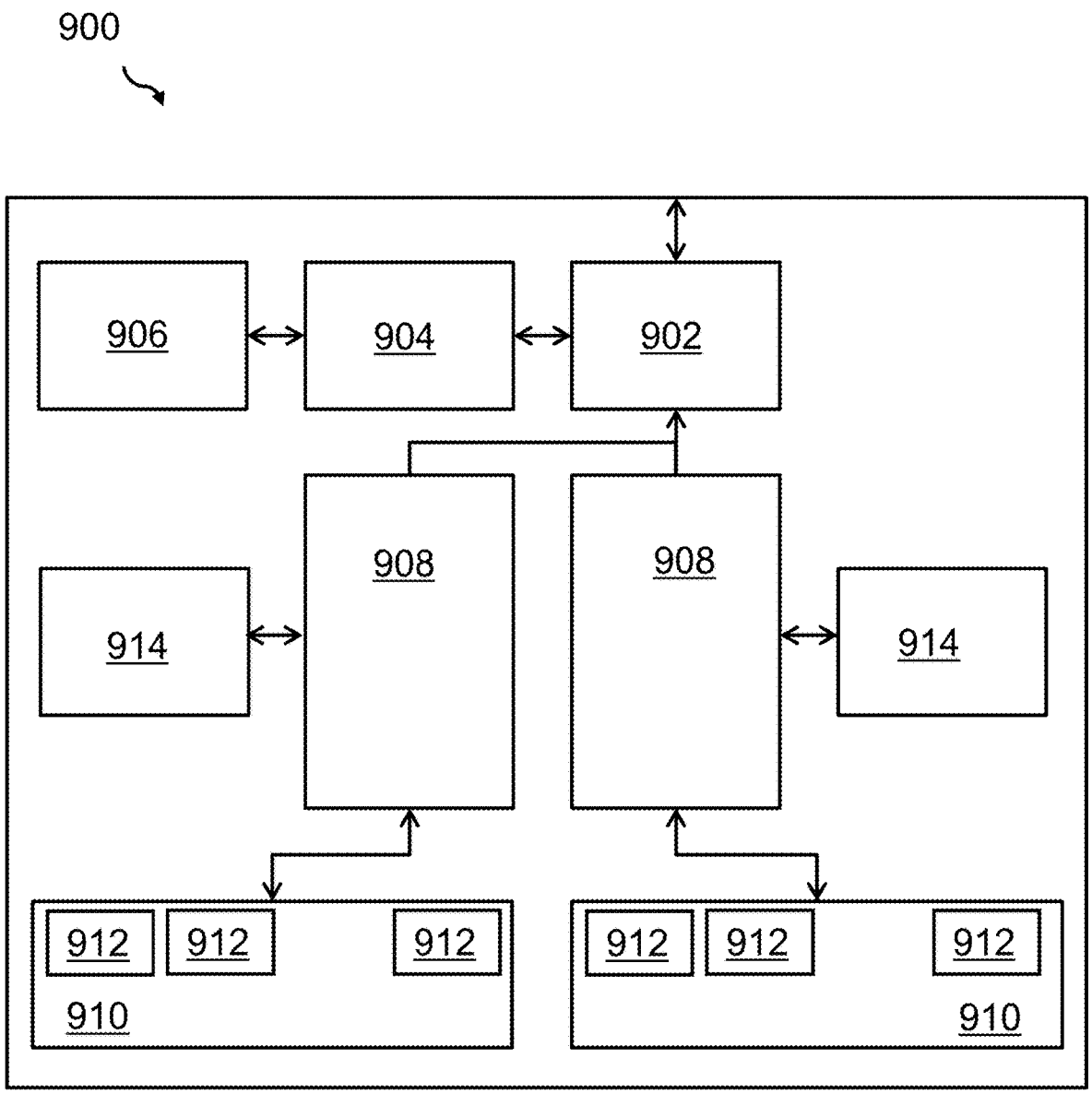

FIG. 9 shows a block diagram of a flash card used in a data storage system that can be utilized to implement the proposed concept.

Figure 10:
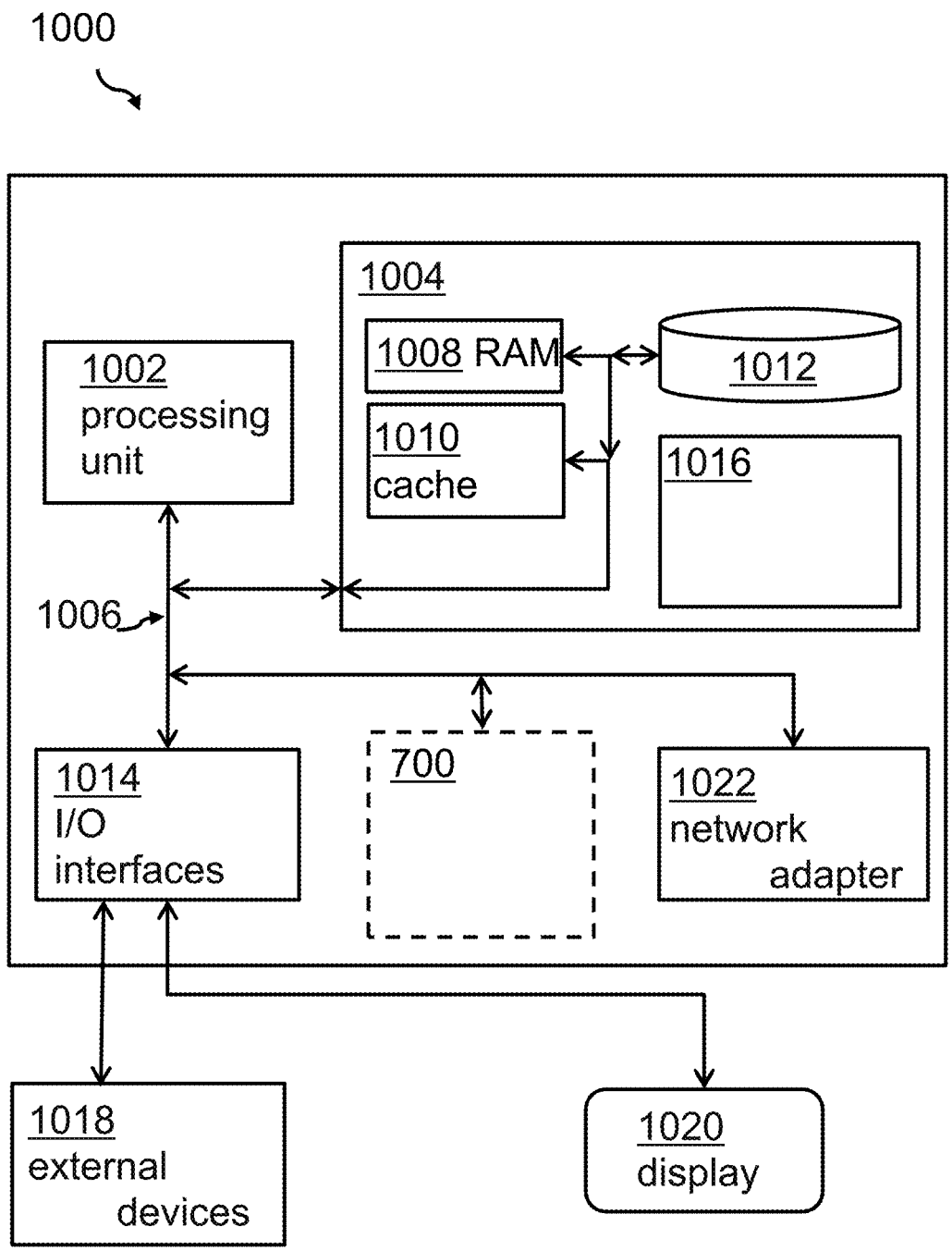

FIG. 10 shows a block diagram of a computing system comprising the system for intra-block recovery according to FIG. 6.

DETAILED DESCRIPTION

In the context of this description, the following conventions, terms and/or expressions may be used:

The term 'intra-block recovery' may denote the process of recovering from an ECC (error correction code) decoder failure during a memory page read operation. The memory pages may also be protected by an Erasure Code (e.g., RAID) parity across blocks—i.e., within a page stripe—as may be known to an expert skilled in the art. The intra-block recovery information is derived from the Erasure Code (e.g., RAID) information being stored as part of a related intra-block parity page, e.g., obtained by XORing the related memory pages in case of a RAID-5 intra-block parity, although higher order protection schemes may also be used for the intra-block parity, for example RAID-6.

The term 'Erasure Code'—in particular, the Erasure Code used to protect a memory page stripe—may relate to the term of coding theory and may denote a forward error correction (FEC) code under the assumption of bit erasures (rather than bit errors), which may transform a message of k symbols into a longer message (code word) with n symbols such that the original message can be recovered from a subset of the n symbols. The fraction r=k/n is called the code rate. The fraction k'/k, where k' denotes the number of symbols required for recovery, may be called reception efficiency.

The term 'data storage device' may denote here, e.g., a single chip comprising all memory cells and related drivers and addressing logic or an equivalent module comprising memory cells and surrounding logic components as separate logic devices. The data storage device may also be used equivalently for a block stripe or another form of memory module, like a memory card, a memory cartridge, a solid-state disk (SSD), and so on.

The term 'memory page' may denote a plurality of memory cells organized as a memory page, e.g., a NAND flash memory page. There may also be shared memory pages—in particular in NAND flash technology—belonging to one word line in case of technologies which store multiple bits per cell. Typical memory page sizes are 2 kB, 4 kB 8 kB or 16 kB. However, with increasing cell density also larger page sizes may be possible. It may also not be possible that the page size is a power of 2. The proposed concept may be applicable to any memory page size. Additionally, it may be mentioned that in typical NAND flash systems the minimum unit data can be written may relate to a memory page, whereas a delete of data may typically be done per entire block of memory pages.

The term 'block'—in particular, a block as part of a block stripe—may denote a (e.g., vertical in our figures) plurality of memory pages (belonging to different page stripes) of a block stripe. Thus, a block may comprise a plurality of memory pages starting at page stripe 0 and continuing to the last page stripe (i.e., page stripe N) of a block stripe. In some instances, there may be a power of two blocks within any device. Each block may contain multiple pages. Using today's technology, the number of pages within a block is typically a multiple of 16 (e.g., 64, 128). Blocks may also be connected to related drivers, controller circuitry and other associated electronic circuits in order to connect the block stripe to a memory bus, or in another way, the other components of a storage system or a computer system.

The term 'block stripe' may denote a plurality of blocks comprising each a plurality of memory pages. A 'page stripe' may be built (logically grouping) from a plurality of memory pages from different blocks in a given block stripe. Typically, page stripes may be a logical grouping of memory pages residing in different blocks (or in different devices on different channels to provide improved speed and fault tolerance).

Hence, the term 'page stripe' may denote a portion of a block stripe. A conventional page stripe may be built from pages that have the same offset in the block stripe. Pages from the page stripe are not independent anymore since writing to a single page from the page stripe may require an update of the parity information located in another page of the page stripe. Hence, it may be assumed in the context of this document that a page stripe is automatically an 'EC protected memory page stripe'.

Consequently, the term 'stripe parity page' may denote a memory page comprising parity in a page stripe information—and in particular RAID information—associated with the page stripe, wherein the page stripe represents a plurality of memory pages. It may also be noted that in flash memory multiple bits being read incorrectly within a single memory page may be a completely normal and expected case. Using an appropriate ECC, flash memory may tolerate up to approximately 1% of bits from the page read incorrectly (logical "1" instead of "0" or the opposite). The information available on the stripe parity page is intended to enable the ECC controller to deal with such faulty bits without negatively influencing the intended purpose of a flash memory page.

The term 'non-volatile memory cell' may denote a memory cell for storing a bit—or in case of TLCs or similar a plurality of bits—in a form that stored information is not lost during a power failure. Thus, it may represent a persistent storage.

The term 'stripe parity page' may denote a memory page in a page stripe comprising parity information—and in particular RAID information—associated with the page stripe, wherein the page stripe represents a plurality of memory pages.

The term 'memory page read failure' may denote that a large number of bits in a page were read incorrectly (e.g., bits read as 0 instead of 1 or vice versa), causing the ECC decoder to fail, i.e., not be able to return the corrected data, during the data decoding.

The proposed method for intra-block recovery of an Erasure Code protected memory page stripe may offer multiple advantages and technical effects:

An effective tool against data losses and wrong data in non-volatile SSD-type storage media may be provided. While the conventional architecture of memory page stripes and blocks of a block stripe may work well for storage media with uncorrelated cell errors across different blocks, it does not perform especially well in case of errors that are expected to happen with high probability across pages that belong to different blocks, but were written at the same time. There, the failures may be highly correlated to a page offset and with the page type. This may be due to the fast shift of a threshold voltage distribution due to short-term retention effects or other threshold voltage drift mechanisms that may be characteristic of various technologies used: 2D vs. 3D NAND, floating gate vs. charge trap 3-D NAND, etc. Other root causes for failures in such flash memory cards may be incomplete threshold voltage distributions at the interface between programmed, un-programmed pages and open blocks, etc.

All of these deficiencies may be addressed successfully with the here proposed concept which may allow read recovery from multiple correlated errors within one page stripe because a cell error on a memory page may be detected and corrected within a block, or more particular within a window of memory pages, wherein the window offers a parity protection perpendicular to the page stripes.

Thus, even higher integrated memory cell architectures may successfully be used even if the risk of correlated failures due to architectures with multiple bits per memory cell increases.

In the following, a detailed description of the figures will be given. All instructions in the figures are schematic. Firstly, a block diagram of an embodiment of the inventive method for intra-block recovery of an Erasure Code protected memory page stripe is given. Afterwards, further embodiments, as well as embodiments of the system for intra-block recovery of an Erasure Code (EC) protected memory page stripe from multiple correlated memory page read failures, will be described.

FIG. 1 shows a block diagram of an embodiment of the method 100 for intra-block recovery of an Erasure Code (EC) protected memory page stripe from multiple correlated memory page read failures. The page stripes may belong to a redundant array of independent disks (RAID), also used for SDDs. The method 100 comprises providing, 102, a data storage device, e.g. in form of a chip, a block stripe, a memory card, or any other memory module. It comprises a plurality of EC protected memory page stripes, each of which comprises a plurality of memory pages.

Corresponding memory pages of the plurality of the page stripes are physically organized as a plurality of blocks comprising each the corresponding memory pages. Thus, basically an error protection matrix of memory pages is built. Each memory page comprises a plurality of non-volatile memory cells, and each page stripe comprises at least one stripe parity page.

The method comprises as well grouping, 104, memory pages of a block into at least one window—and in a more advanced embodiment in a plurality logical window, which may be a non-consecutive or physical consecutive window or, alternatively, logically grouped memory pages. Each of the windows comprises a plurality of memory pages of the block.

Furthermore, the method comprises maintaining, 106, at least one parity page for each window. This at least one window parity page relates to a window or the entire block and is available in addition to the page stripe parity page. This way, a page read failure is recoverable through the intra-block parity protection, even if multiple—i.e., higher than the EC correction capability—page per page stripe experience a read failure concurrently, in which case the inter-block EC parity protection cannot be used to recover the data. The term 'concurrently' or 'simultaneously' may be interpreted here in the sense that the ECC decoder is not able to correct read errors from multiple memory pages that occur on different pages on a page stripe.

Before discussing specific embodiments of the here proposed concept and for a general understanding in which context the here proposed concept may be implemented advantageously, reference is now made to FIG. 8, in which a block diagram of an exemplary flash memory module 800 is depicted, which may be used to implement the here proposed concept. The flash memory module 800 comprises one or more memory dies, each implementing at least one memory array 802, e.g., formed of 3-D NAND flash memory cells. As indicated in FIG. 8, the memory cells within the memory array 802 are physically arranged in multiple blocks 804, in turn comprising multiple physical pages 806.

As known to those skilled in the art, NAND flash memory, such as that employed in memory array 802, has to be erased prior to being programmed. Further, NAND flash memory can be (but is not required to be) constrained by its architecture, such that the smallest granule of storage that can be erased is a block 804 and the smallest granule of storage that can be accessed by a read or write operation is fixed to the size of a single physical page 806 (as already explained above in another context). It should be appreciated in this regard that the LBAs (logical block address) provided by a host device correspond to logical pages within a logical address space, wherein each logical page typically has a size of e.g., 4 kB (kilobytes). Physical pages 806, in contrast, typically have a larger size, e.g., 16 kB, and can thus correspond to multiple logical pages.

The flash memory module 800 further comprises a row decoder 810, through which word lines of the memory array 802 may be addressed (address line 818, 820)) and the column decoder 812, through which bit lines of the memory array 802 may be addressed (address line 818). In addition, the flash memory module 800 comprises a read/write circuit 814 that enables the memory cells of a physical page 806 to be programmed or read in parallel. The flash controller circuitry at 800 additionally comprises a control circuit 805 that provides chip-level control of operations (commands 822, 824) of the memory array 802, including read and write accesses made to physical memory pages 806, erasure of data in blocks 804, and the amplitude, duration and plurality of related voltages applied to the memory array 802. The data input/output to/from the flash memory module 800 may flow along the double arrow 824. It may be helpful to keep this general architecture in mind when referring to the following figures.

FIG. 9 shows a block diagram of a flash card 900 used in a data storage system (not shown). The here proposed concept—either as a method or as a related controller/system—may be implemented on the level of the flash card 900.

The flash card 900 includes a gateway 902 that serves as an interface between the flash card 900 and RAID controllers or host bus adapters (HBA) of the data storage system (not shown). The gateway 902 is coupled to a general-purpose processor (GPP) 904, which can be configured (e.g., by program code) to perform pre-processing on operations received by the gateway 902 and/or to schedule servicing of the operations by the flash card 900. The GPP 904 is coupled to a GPP memory 906 (random access memory/DRAM) that can conveniently buffer data created, reference and or modified by GPP 904 in the cause of its processing or data flowing through the gateway 902 destined for one or more of the flash controllers 908.

The gateway 902 is further coupled to one or more flash controllers 908, each of which controls a respective NAND flash memory system 910 which comprises multiple individually addressable NAND flash memory storage devices 912. The flash controllers 908 can be implemented, for example, by an ASIC (application specific integrated circuit) and/or a FPGA (field programmable gate array), and/or a microprocessor, and each flash controller 908 can have an associated flash controller memory 914 (e.g., DRAM). In embodiments in which flash controllers 908 are implemented with an FPGA, the GPP 904 may program and configure the flash controllers 908 during start-up and data of the higher-level data storage system. After start-up, in general, and operation, the flash controllers 908 receive read and write operations from the gateway 902 that requests to read data stored in the NAND flash memory system 910 and/or to store data in the NAND flash memory system 910. The flash controllers 908 service these operations, for example, by accessing the NAND flash memory system 910 to read or write the requested data from or into the NAND flash memory system 910, or by accessing a memory cache (not illustrated) associated with the NAND flash memory system 910.

The flash controllers 908 implement a flash translation layer (FTL) that provides a logical-to-physical address translation to enable access to specific memory locations within the NAND flash memory system 910. In general, an operation received by the flash controller 908 from a host device, such as a higher-level processor system, contains the logical block address (LBA) at which the data is to be accessed (read or written) and, if a write operation, the write data to be stored to the NAND flash memory system 910. The operation may also specify the amount (or size) of the data to be accessed. Other information may also be communicated depending on the protocol and features supported by the data storage system. The flash translation layer translates LBAs received from a RAID controller into physical addresses assigned to corresponding physical locations in the NAND flash memory system 910. The flash controllers 908 may perform address translations and or store mappings between logical and physical addresses in a logical-to-physical translation data structure, such as a logical-to-physical translation table (LPT), which may conveniently be stored in the flash controller memory 914.

FIG. 2 shows a block diagram of a traditional block stripe 200 comprising a plurality of memory pages. The memory pages 202, 206 (which correspond to the memory pages 806 of the general FIG. 8) are organized in a plurality of page stripes 204, 208. Thus, all memory pages 202 belong to the page stripe 204, while all memory pages 206 relate to page stripe 208. Additionally, the memory pages 202, 206 are grouped in so-called blocks 210, 212, 214, 216, 218 of memory pages (each corresponding to one block 804 of a different memory array 802 of general FIG. 8). Thus, a matrix-like organization of memory pages is created. It may be noted that the blocks, 210, . . . , 218 are typically stored on memory arrays 802 on different channels or lanes of a flash controller for improved performance and improved fault tolerance. Each of the plurality of page stripes 204, 208 is built as a RAID stripe using Erasure Code (EC) techniques for protecting the data and is stored in the memory pages 202, 206 in each of the stripes 204, 208. The page stripes may be numbered from PageStripe0 204 to PageStripeN 208. Accordingly, the blocks or lanes may be numbered from block0 210, located at lane0, respectively, to blockM 218, located at laneM, respectively.

FIG. 3 shows a block diagram with TLC-type-based memory pages of a block stripe 300. For simplicity reasons, memory pages 202, 206 of page stripes 204, 208 are shown without any differences. However, in TCL NAND memories, three types of data pages may exist. These are typically called lower, upper and extra page. These are shown extra in the middle of the blocks as PageStripeL 304, PageStripeU 308 and PageStripeX 312. All other memory pages (not shown) and page stripes of the block stripe 300 may be organized equivalently. Hence, across blocks (that are normally located on different channels, or lanes), a page stripe which is also organized as a RAID stripe is typically created across pages of the same type and typically at the same time. In the shown example, PageStripe0 204 may be composed of only SLC pages (single-level cell), PageStripeL 304 is composed only of lower pages, PageStripeU 308 is composed only of upper pages 306 and PageStripeX 312 only of extra pages 310.

It may be also noted that although FIG. 3 shows the lower, upper and extra pages to be sequentially arranged, it may also be possible to have an interleaving organization, due to a specific programming (write) order.

Due to the TLC-type memory cells in this example, memory pages in PageStripeX 312 may be more likely to have failures than pages in PageStripeL 304 and PageStripeU 308 in other words, if one page in PageStripeX 312 fails, it may be more likely that other pages in PageStripeX 312 fail as well, than pages in PageStripeL 304 and PageStripeU 308 due to the nature of memory cells of type TLC.

However, the failure problem of PageStripeX 312 just described is not strictly related to 3D NAND flash memory cells and is present in various forms and extends also in 2D NAND flash memory cells and also in other non-volatile storage media, like PCMs where a probability of failure depends on the internal storage media organization and architecture and particular physical properties of the given storage media.

FIG. 4 shows a block diagram 400 of the TLC-type-based memory pages highlighting memory pages with a higher failure probability (as already mentioned in the context of FIG. 3). Basically, FIG. 4 is not that much different if compared to FIG. 3. It only highlights by the crossed PageStripeX 312 that the extra pages of a block stripe using TCL are much more likely to have higher error—even uncorrectable—counts, than lower or upper pages. It may actually happen that multiple memory pages 310 of the PageStripeX 312 fail at the same time, and therefore data from the page stripe 312 cannot be corrected using the parity information from the page stripe 312. However, this situation is addressed by the inventive solution according to FIG. 5.

FIG. 5 shows a block diagram 500 of an embodiment of a single block of memory pages with a single window 502. It may be noted that—as an example—only block2 214 of the previous FIGS. 2 to 4 is shown. However, the same concept may be applied to all other blocks of the entire block stripe. Just to be clear: memory page 202, as well as, memory pages 302, 306, 310, are used as regular memory pages of a particular page stripe each, like those according to FIG. 3 and/or FIG. 4. However, one of the memory pages of the window 502 is used as parity page for the entire window 502. The same concept may be applied to all other blocks (not shown here). Every page in a page stripe is protected by another parity page not belonging to that page stripe. In other words, an additional parity page becomes available for every block in a block stripe. Remember: each page stripe comprises its related parity page. Now—in a matrix-like fashion—a second parity page is made available. In FIG. 5, memory page 504 is shown as parity page for the block 214. However, also another memory page of the window 502 may be used. It may be noted that only one window 502 is shown for the entire block 214.

As a consequence, if a page in the page stripe cannot be read successfully, e.g., memory page 310 cannot be successfully read, the data of memory page 310 can still be recovered by reading data from memory pages 202, . . . , 302, 306 and the parity page 504, thus all pages of the block 214, i.e., all other still readable pages from the block 214, and computing the data from the unreadable page 310 from on all readable pages 202, . . . , 302, 306, 504.

Even if the page stripe of memory page 310 (in the previous figures, PageStripeX 312) fails on more than one block in the block stripe, rendering PageStripeX 312 impossible to recover with conventional parity across blocks, since now intra-block parity is used, the data of the memory page 310 can be recovered using the block parity page 504.

FIG. 6 shows a block diagram of an embodiment of a block stripe 600 with an exemplary single block 214 of memory pages with a plurality of windows in which the memory pages are grouped. This represents an enhanced version of the proposed concept because more than one window is used per block. It may be noted that the memory pages 202, 302, 306, 310 are the same as in the preceding figures. It is assumed that there is no change in the block, or stripe relationship.

With the multiple window approach, it is not necessary to read the entire block in case of an unrecoverable error within a page stripe in order to repair the memory page belonging to a specific block having only one single window relating to it. Thus, using only one window per block may impact storage latency negatively. Secondly, in case multiple pages in a block fail reading (which may not have been recoverable within the page stripe as well), the entire block stripe would not be able to recover from such a failure. Thus, it is advantageous to group memory pages of a block into a plurality of windows, since in that case read failures from each window can recover independently, increasing the overall fault tolerance of the device. The memory pages in such a window may be adjacent (or consecutive) memory pages. Alternatively, a window may be a logical window comprising a plurality of memory pages of a block spread across the block. This may reflect certain write algorithms within a block stripe.

Now, also additional memory pages 608, 610 are shown exemplary. In typical cases, it may be assumed that two or more memory pages may be present within each of the windows 602, 604, 606. In a real application, typically, more than three windows may be used. However, each window comprises now its own one or more parity pages. In case of window 602, memory page 608 may represent the parity page, in window 604, memory page 610 may represent the parity page, and in window 606, memory page 612 may represent the parity page. Note that the number of parity pages may vary for each window based on, for example, particular physical properties of the given storage media.

The assignment of memory pages to a specific window may be done statically or dynamically. The static assignment may be based on large-scale characterization data—e.g., such windows may consist of pages which are least likely to have correlated failures. Alternatively, the assignment of memory pages to specific windows may be based on runtime characteristics—i.e., dynamically measured parameters—e.g., if there is a large pause between write operations to the block, then the current window may be closed.

An advantage of the windowing approach for a block stripe is in the fact, that if there is the need for recovery of a page of a specific window, only the memory pages from the related window have to be read, which may significantly improve latency and the probability of recovery.

The so far discussed approaches in the context of FIG. 5 and FIG. 6 clearly help to circumvent long-term data reliability issues, but at the same time may decrease the effective storage capacity since it uses a part of the storage capacity for storing parity information—i.e., one or more parity page per window in a given block.

It is known that in some cases, memory technology has issues that exhibit particularly for partially programmed (or written) blocks, i.e., blocks that have not been completely written or filled with data. However, as soon as these blocks are completed and closed, the issues of undesired effects in memory cells in the memory pages may disappear and the data may become reliable and readable again.

Since these issues are also highly correlated to the page type (e.g., extra pages may be more susceptible to these types of issues), it may be desirable to keep only a "running" intra-block parity for these blocks, or an intra-window parity page for a respective window within a block. While the data is being written, the running parity for the block is only updated to the storage outside the block stripe, which may even be outside flash memory module 800, e.g., in volatile or non-volatile memory of a related computer system, in volatile or non-volatile memory of a controller, and so on. Once the block is completed—i.e., completely written—the running parity outside the block stripe is discarded. Therefore, there is no storage overhead within a block any longer, i.e., the page 504 can again be used for writing user data.

The same concept may also be applied to a windowed approach in which each window has its own parity page. For each of the windows, a separate running parity page is maintained outside the block stripe. This running parity page may then be discarded as soon as a window is closed and data starts being written to a new memory page in a new window. Alternatively, the running parity pages may be maintained for a certain number of windows, and discarded e.g. after either a predefined budget of running parities is exhausted, or the entire block is written with data, or when a certain predefined number of blocks is written with data, or when certain time from fully writing the block expires, etc. Therefore, memory pages 608, 610, 612 can be written with user data, eliminating the potential storage overhead.

It may also be noted that a window may typically comprise between five and 50 memory pages in the current technology (which may change in future technology without deriving from the proposed concept). Also in this advanced concept, only the memory pages of a window may have to be read together with the running memory page kept outside of the block stripe in order to recover a memory page in a window which may not be recoverable within a page stripe.

FIG. 7 shows a simplified block diagram of the system 700 for intra-block recovery of an Erasure Code protected memory page stripe from multiple correlated memory page read failures. The system 700 comprises a data storage device comprising a plurality of EC protected memory page stripes 204, 304, 308, . . . , 208 (please compare FIG. 4), each of which comprising a plurality of memory pages (not shown). In that, corresponding pages of the plurality of the page stripes are organized as a plurality of blocks comprising each the corresponding pages, each memory page comprising a plurality of non-volatile memory cells, and each page stripe comprises at least one stripe parity page.

Additionally, the system 700 comprises a grouping unit 702 adapted for grouping memory pages of a block into at least one window. Thereby, each window comprises a plurality of memory pages of the block. Furthermore, the system 700 comprises at least one parity page 704 for each window of the block, such that a page read failure is recoverable even if more than one memory page per page stripe causes a read failure. It may be noted that the parity page may have the same amount of memory cells as any other regular memory page.

It may also be mentioned that the memory pages—i.e., page stripes as well as the blocks may be integrated into the data storage device, together with the storage controller and the page grouping unit 702 and the parity page 704. Additionally, an interface controller 706 for accessing the memory cells of the system may be included. The double arrows represent control and/or data flows between the different units.

Embodiments of the invention may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, storage systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the system 700 for intra-block recovery of an Erasure Code (EC) protected memory page stripe from multiple correlated memory page read failures (or alternatively the flash memory module according to FIG. 8 having implemented the here proposed concept) may be attached to the bus system 1006 or I/O interfaces 1014, or may be implemented in an external device 1019 such as an external storage system.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for intra-block recovery of an Erasure Code (EC) protected memory page stripe from multiple correlated memory page read failures, the method comprising:
    providing a data storage device comprising a plurality of memory pages, said plurality of memory pages organized as a plurality of EC protected memory page stripes and a plurality of blocks, wherein each of said plurality of memory pages comprises a plurality of non-volatile memory cells, and wherein each of said plurality of EC protected memory page stripes comprises at least one of said memory pages from each of at least two of said blocks and comprises at least one stripe parity page;
    grouping said plurality of memory pages of a block into at least one window, each window comprising a proper subset of said memory pages of the block; and
    maintaining at least one window parity page for each of said at least one window, such that a page read failure is recoverable when said plurality of EC protected memory page stripes experience a concurrent read failure, wherein the window parity page is maintained outside the plurality of EC protected memory page stripes.

2. The method according to claim 1, wherein each window is a physical window comprising consecutive memory pages of a block or a logical window comprising non-consecutive memory pages of a block.

3. The method according to claim 1, wherein a window size is set according to a predefined schema and the grouping of memory pages into a window is performed according to the predefined schema.

4. The method according to claim 3, wherein the predefined schema reflects a likelihood of the memory pages to cause a read failure.

5. The method according to claim 1, wherein a window size and the grouping of the memory pages is determined dynamically based on statistics of the data storage device.

6. The method according to claim 5, wherein a parameter of the statistics is a function of data written to the data storage device.

7. The method according to claim 1, wherein the window parity page is one of the memory pages of a corresponding window.

8. The method according to claim 1, wherein, upon a power failure, the window parity page is maintained in a persistent storage.

9. The method according to claim 1, wherein the window parity page is released once all memory pages of a corresponding window are completely written.

10. The method according to claim 1, wherein the window parity page is released once a predefined number of memory pages of a corresponding window are completely written.

11. The method according to claim 1, wherein the window parity page is released once a corresponding block of memory pages is completely written.

12. The method according to claim 1, wherein the memory pages comprise at least one selected out of a group comprising: multi-level cells, triple-level memory cells, and quadruple-level cells.

13. The method according to claim 1, where in the data storage device is a component of a memory flash drive.

14. A system for intra-block recovery of an Erasure Code (EC) protected memory page stripe from multiple correlated memory page read failures, the system comprising:
- a data storage device comprising a plurality of memory pages, said plurality of memory pages organized as a plurality of EC protected memory page stripes and a plurality of blocks, wherein each of said plurality of memory pages comprises a plurality of non-volatile memory cells, and wherein each of said plurality of EC protected memory page stripes comprises at least one of said memory pages from each of at least two of said blocks and comprises at least one stripe parity page;
- a grouping unit adapted for grouping said plurality of memory pages of a block into at least one window, each window comprising a proper subset of said memory pages of the block; and
- at least one window parity page for each of said at least one window, such that a page read failure is recoverable when said plurality of EC protected memory page stripes experience a concurrent read failure, wherein the window parity page is maintained outside the EC protected memory page stripes.

15. The system according to claim 14, wherein each window is a physical window comprising consecutive memory pages of a block or a logical window comprising non-consecutive memory pages of a block.

16. The system according to claim 14, wherein the grouping unit is also adapted for performing the grouping according to a predefined schema reflecting a likelihood of the memory pages to cause a read failure.

17. The system according to claim 14, wherein a window size and the grouping of the memory pages is determined dynamically based on statistics of the data storage device.

18. The system according to claim 14, wherein the grouping unit is also adapted for grouping of the memory pages dynamically based on a parameter representing a function of data written to the data storage device.

19. The system according to claim 14, wherein the window parity page is one of the memory pages of the corresponding window.

20. The system according to claim 14, also comprising a persistent storage adapted for, in case of a power failure, storing the window parity pages.

21. The system according to claim 14, wherein the window parity page is released once all memory pages of a corresponding window are completely written or, the window parity page is released once a predefined number of memory pages of a corresponding window are completely written, or the window parity page is released once a corresponding block of memory pages is completely written.

22. The system according to claim 14, wherein the memory pages comprise at least one selected out of a group comprising: multi-level cells, triple-level memory cells, and quadruple-level cells.

23. The system according to claim 14, wherein the data storage device is a component of a memory flash drive.

24. A non-transitory computer readable medium comprising computer executable instructions which when executed by a computer cause the computer to perform a method of:
- grouping memory pages of a block of a data storage device into at least one window, each window comprising a proper subset of said memory pages of the block, the data storage device comprising a plurality of EC protected memory page stripes, wherein each of said plurality of memory pages comprises a plurality of non-volatile memory cells, and wherein each of said plurality of EC protected memory page stripes comprises at least one of said memory pages from each of at least two of said blocks and comprises at least one stripe parity page; and
- maintaining at least one window parity page for each of said at least one window, such that a page read failure is recoverable when said plurality of EC protected memory page stripes experience a concurrent read failure, wherein the window parity page is maintained outside the EC protected page stripes.

* * * * *